United States Patent
Nakanishi

(10) Patent No.: US 8,605,463 B2
(45) Date of Patent: Dec. 10, 2013

(54) RESONANT SWITCHING POWER SUPPLY DEVICE TO REDUCE A FREQUENCY INCREASE IN LIGHT LOADS

(75) Inventor: Ryouta Nakanishi, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 187 days.

(21) Appl. No.: 12/862,374

(22) Filed: Aug. 24, 2010

(65) Prior Publication Data

US 2011/0051467 A1    Mar. 3, 2011

(30) Foreign Application Priority Data

Aug. 26, 2009  (JP) ................................ 2009-194908

(51) Int. Cl.
 *H02M 3/335* (2006.01)
(52) U.S. Cl.
 USPC .......... 363/21.02; 363/21.04; 363/41; 363/45
(58) Field of Classification Search
 USPC ................. 363/21.02, 21.03, 39–48
 See application file for complete search history.

(56) References Cited

U.S. PATENT DOCUMENTS

| | | | | |
|---|---|---|---|---|
| 4,507,721 A | * | 3/1985 | Yamano et al. | 363/20 |
| 5,689,180 A | * | 11/1997 | Carlson | 323/359 |
| 5,724,236 A | * | 3/1998 | Oglesbee | 363/40 |
| 7,643,314 B2 | * | 1/2010 | Sato | 363/21.02 |
| 7,868,724 B2 | * | 1/2011 | Sicong et al. | 336/84 R |
| 8,023,294 B2 | * | 9/2011 | Ryan et al. | 363/40 |
| 2004/0004524 A1 | * | 1/2004 | Mayfield | 336/83 |
| 2009/0272735 A1 | * | 11/2009 | Suenaga et al. | 219/702 |

FOREIGN PATENT DOCUMENTS

| | | |
|---|---|---|
| JP | 51-144911 A | 12/1976 |
| JP | 54-7531 A | 1/1979 |
| JP | 58-22579 A | 2/1983 |
| JP | 60-174064 A | 9/1985 |

\* cited by examiner

*Primary Examiner* — Adolf Berhane
*Assistant Examiner* — Lakaisha Jackson
(74) *Attorney, Agent, or Firm* — Birch, Stewart, Kolasch & Birch, LLP

(57) ABSTRACT

Provided is a resonant switching power supply device that can reduce a common mode noise as well as an increase in frequency when a load is light.
A resonant switching power supply device 1 equipped with a PFM control circuit 10 to control a switching frequency in such a way that an output voltage is brought to a desired value includes: a resonant circuit where a primary winding N1 of a transformer T2, a current resonant capacitor Cri and a reactor Lr are connected in series; rectifying circuits D1, D2 and Co that are connected to secondary windings N2 and N3 of the transformer T2 and obtain the output voltage Vo; and an electrostatic shield plate S1 disposed between the primary winding N1 and secondary windings N2 and N3 of the transformer T2. The reactor Lr is connected to one terminal of the primary winding N1 of the transformer T2 and the current resonant capacitor Cri is connected to the other terminal of the primary winding N1 of the transformer T2; and the electrostatic shield plate S1 is connected to a terminal of the reactor Lr that is situated at the side opposite to where the primary winding N1 of the transformer T2 is connected.

16 Claims, 10 Drawing Sheets

PRIOR ART
FIG.3
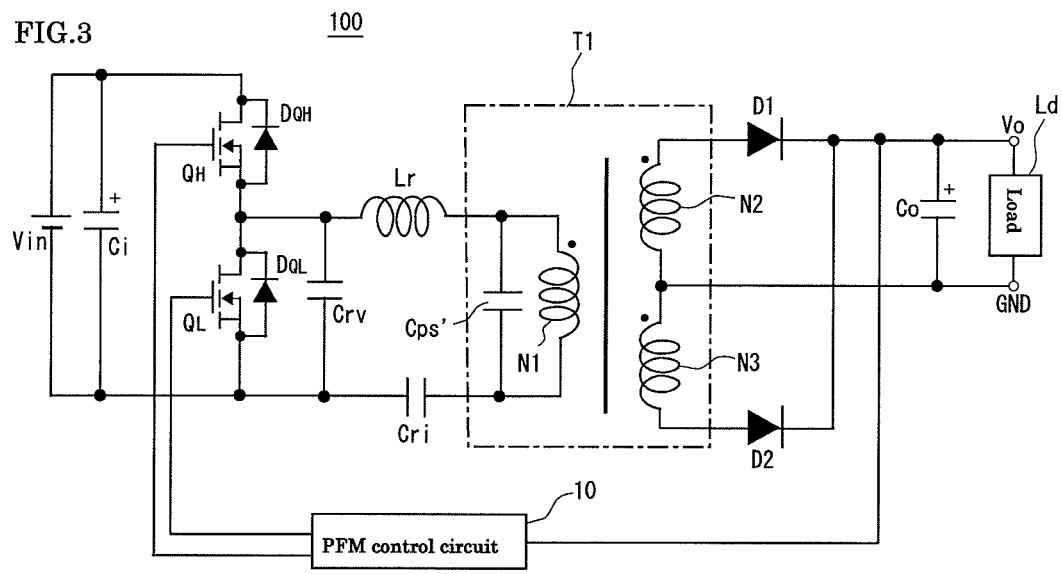
PRIOR ART
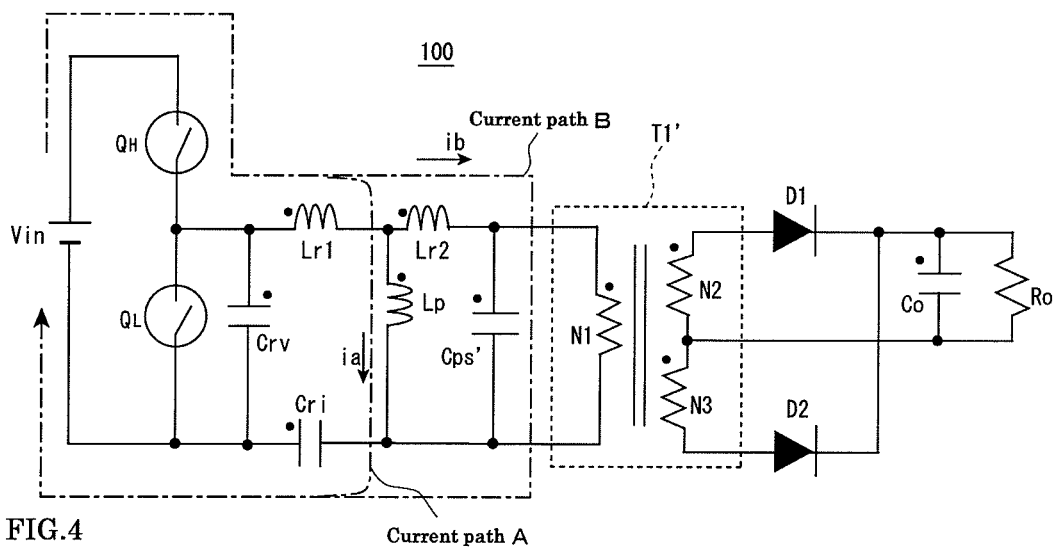
FIG.4

PRIOR ART

RESONANT SWITCHING POWER SUPPLY DEVICE TO REDUCE A FREQUENCY INCREASE IN LIGHT LOADS

BACKGROUND OF THE INVENTION

1. Field of the Invention

The present invention relates to a resonant switching power supply device and particularly to a resonant switching power supply device able to reduce an increase in switching frequency when a load is light.

2. Description of the Related Art

As a stabilized direct-current power supply device, a resonant switching power supply device has been used. The resonant switching power supply device is equipped with: high-side and low-side switching elements that are connected in series between the cathode and anode of an input direct-current power source; and a resonant circuit that is connected in parallel to one of the switching elements and consists of a primary winding of a transformer and a current resonant capacitor. A resonant current flows through a primary-side inductance element of the transformer and the current resonant capacitor as the switching elements are turned on and off. At this time, the voltage obtained at a second winding of the transformer is rectified. A direct-current voltage is therefore obtained at the output side.

The resonant switching power supply device can adopt a control method called PFM (Pulse Frequency Modulation) control to control an output voltage by changing the switching frequency. The PFM control makes use of the following characteristic: the output voltage rises when the switching frequency is set close to a resonant frequency of the primary-side inductance element of the transformer and the current resonant capacitor, and the output voltage decreases when the switching frequency is set away from the resonant frequency. When a higher frequency range than the resonant frequency is used as the switching frequency, the switching frequency is raised while the output voltage is decreased, and the switching frequency is lowered while the output voltage is increased. In this case, the output voltage is fed back and the switching frequency of the switching elements is automatically controlled so that an output direct-current voltage is stabilized.

In such a resonant switching power supply device, a switching operation causes noises, which have a bad effect on other devices. Therefore, various steps are taken to shield the devices from the noises.

For example, what is disclosed in Jpn. Pat. Appln. Laid-Open Publication No. 51-144911 (Patent Document 1) is a technique of disposing an electrostatic shield plate inside and outside a primary winding of a transformer in such a way that the primary winding of the transformer is covered with; similarly disposing an electrostatic shield plate in such a way that a secondary winding of the transformer is covered with; connecting the electrostatic shield plate that covers the primary winding of the transformer to the positive side of a primary-side power source; and connecting the electrostatic shield plate that covers the secondary winding of the transformer to GND of a secondary-side power source. Therefore, a noise current resulting from a stray capacitance of the transformer's primary winding is sent back to the primary-side power source through the electrostatic shield plate; a noise current resulting from a stray capacitance of the transformer's secondary winding is grounded to the secondary GND through the electrostatic shield plate. A common mode noise is therefore reduced.

What is disclosed in Jpn. Pat. Appln. Laid-Open Publication No. 54-7531 (Patent Document 2) is a technique of providing an electrostatic shield plate between the primary and secondary windings of a transformer; and connecting the electrostatic shield plate to one end of the transformer's primary winding. In this case, the stray capacitance is divided into two capacitors, one between the primary winding and the electrostatic shield plate and the other between the electrostatic shield plate and the secondary winding; the two capacitors are connected in series. Accordingly, in terms of an equivalent circuit, the capacitance becomes smaller and the noise is therefore reduced. Moreover, in the half-bridge power source, a flat loop extending from the stray capacitance to the electrostatic shield plate and the primary winding is formed after the electrostatic shield plate is connected to the middle point of the capacitor. Therefore, a noise current resulting from the stray capacitance of the primary winding is sent back to the primary winding of the transformer.

What is disclosed in Jpn. Pat. Appln. Laid-Open Publication No. 60-174064 (Patent Document 3) is a technique of providing a two-layer electrostatic shield plate between the primary and secondary windings of a transformer; connecting to the positive or negative side of an input power source the electrostatic shield plate that is closer to the primary winding; and connecting to the positive or negative side of a secondary-side output the electrostatic shield plate that is closer to the secondary winding. The technique enables a common mode noise to be reduced.

What is disclosed in Jpn. Pat. Appln. Laid-Open Publication No. 58-22579 (Patent Document 4) is a technique of inserting a ring-shaped core into an input/output line of a transformer. The technique enables an output terminal noise, an input terminal noise and a radiation noise to be reduced.

CITATION LIST

Patent Document

[Patent Document 1] Jpn. Pat. Appln. Laid-Open Publication No. 51-144911

[Patent Document 2] Jpn. Pat. Appln. Laid-Open Publication No. 54-7531

[Patent Document 3] Jpn. Pat. Appln. Laid-Open Publication No. 60-174064

[Patent Document 4] Jpn. Pat. Appln. Laid-Open Publication No. 58-22579

In the resonant switching power supply device, there is the following phenomenon: an oscillating voltage is superimposed on a secondary-side voltage due to the stray capacitance of a transformer and leakage inductance when a load is light, the oscillating voltage charges an output smoothing capacitor to the peak, and an output voltage therefore rises. In the resonant switching power supply device, the output voltage is fed back and the switching frequency is PFM-controlled so that the output voltage gets stabilized. Therefore, the problem is that if the output voltage rises after the oscillating voltage charges the output smoothing capacitor to the peak as described above, the switching frequency, in turn, rises to reduce the increase of the output voltage.

According to the conventional techniques disclosed in Patent Documents 1 to 4, the electrostatic shield plate or ring-shaped core is used to address common mode noises. However, the electrostatic shield plate and ring-shaped core do not play a role in reducing the oscillating voltage, which is superimposed on the secondary-side voltage due to the stray capacitance of the transformer and the leakage inductance. The increases in the switching frequency, when the load is light, prevent the switching power supply device from being operated in a high efficient manner as well as being operated at high frequencies for the purpose of downsizing. Therefore, a technique of reducing the oscillation of the secondary-side voltage when the load is light to reduce an increase in switching frequency is needed.

The following provides a more detailed description of the problem of the increase in the switching frequency when the load is light.

FIG. 1 shows a conventional resonant switching power supply device 100 that is not equipped with an electrostatic shield plate. The following describes the circuit configuration and operation of the resonant switching power supply device 100 shown in FIG. 1.

In the resonant switching power supply device 100 shown in FIG. 1, the reference symbol Ci represents a smoothing capacitor, Cri a current resonant capacitor, Co a smoothing capacitor, Crv a voltage resonant capacitor, QH a high-side switching element or a N-channel MOSFET, QL a low-side switching element or a N-channel MOSFET, DQH, DQL D1 and D2 diodes, Lr a reactor, T1 a transformer, N1 a primary winding of the transformer T1, N2 a secondary winding of the transformer T1, N3 a secondary winding of the transformer T1, and Ld a load. The reference symbol Cps represents the stray capacitance that exists between the primary winding N1 of the transformer T1 and the secondary windings N2 and N3. The reference numeral 10 denotes a PFM control circuit that controls an output voltage. The reference symbol Vin represents an input direct-current power source.

The resonant switching power supply device 100 is made with a half-bridge circuit. The smoothing capacitor Ci is connected to both ends of the input direct-current power source Vin. The drain terminal of the switching element QH is connected to the positive terminal of the input direct-current power source Vin. The source terminal of the switching element QL is connected to the negative terminal of the input direct-current power source Vin. The source terminal of the switching element QH and the drain terminal of the switching element QL are connected together.

The voltage resonant capacitor Crv is connected in parallel to the drain and source terminals of the switching element QL; a series circuit in which the reactor Lr, the primary winding N1 and the current resonant capacitor Cri are connected in series is connected in parallel. The reactor Lr is a reactor connected in series to the primary winding N1 or the primary leakage inductance of the transformer T1. The use of a leakage transformer as the transformer T1 is preferable because the primary leakage inductance can be used as the reactor Lr. When the leakage transformer is used, it is not necessary for the reactor Lr to be connected in series to the primary winding N1. However, if the reactor Lr is connected in series to the primary winding N1, the sum of the primary leakage inductance of the transformer T1 and the value of the inductance of the reactor Lr is regarded as a primary-side inductance value Lr1. Incidentally, the reactor Lr may be connected where the current resonant capacitor Cri used to be while the current resonant capacitor Cri may be connected where the reactor Lr used to be.

The diode DQH is connected between the drain and source of the switching element QH; the diode DQL is connected between the drain and source of the switching element QL. The diodes DQH and DQL are diodes built into the switching elements QH and QL or external diodes connected to the switching elements QH and QL. The diodes DQH and DQL are connected in the direction opposite to the flow of current through the switching elements QH and QL (anti-parallel connection).

The input terminal of the PFM control circuit 10 is connected to an output voltage terminal Vo, and the output terminal to the gate terminals of the switching elements QH and QL.

The polarity of the voltage that occurs at each of the windings N1, N2 and N3 of the transformer T1 is indicated by dot (•). The anode terminal of the diode D1 is connected to one terminal (•-side) of the secondary winding N2 of the transformer T1. The cathode terminal of the diode D1 is connected to one terminal (positive-side terminal) of the smoothing capacitor Co and the output terminal Vo. The other terminal of the secondary winding N2 of the transformer T1 and one terminal (•-side) of the secondary winding N3 of the transformer T1 are connected in series. The other terminal of the secondary winding N2 of the transformer T1 and one terminal (•-side) of the secondary winding N3 of the transformer T1 are also connected to the other terminal (negative-side terminal) of the smoothing capacitor Co and an output GND terminal. The other terminal of the secondary winding N3 of the transformer T1 is connected to the anode of the diode D2. The cathode terminal of the diode D2 is connected to a connection point where one terminal (positive-side terminal) of the smoothing capacitor Co, the cathode terminal of the diode D1 and the output terminal Vo are connected together. The load Ld is connected to both ends of the smoothing capacitor Co.

The capacitor Cps represents the stray capacitance that exists between the primary winding N1 and secondary windings N2 and N3 of the transformer T1.

The PFM control circuit 10 performs a PFM control process by alternately turning the switching elements QL and QH on and off on the basis of the output voltage Vo from the smoothing capacitor Co, setting the on-duty of the switching elements QL and QH at about 50%, and changing the frequency of the switching elements QL and QH so the output voltage Vo of the smoothing capacitor Co becomes constant. Incidentally, there is dead time to prevent both the switching elements QL and QH from being turned on at the same time.

The following describes the operation of the resonant switching power supply device 100 having the above configuration. First, the operation of the resonant switching power supply device 100 around a rated load will be described. Secondly, the problem of the increase in switching frequency resulting from the stray capacitance and leakage inductance when there is no load will be described.

In this case, around the rated load, the current flowing through the transformer T1 is so large that the current flowing through the stray capacitance Cps can be ignored. In addition, it is unlikely that an oscillating voltage occurs. Therefore, the stray capacitance Cps is ignored. When there is no load, the current flowing through the transformer T1 is so small that the current flowing through the stray capacitance Cps cannot be ignored. An oscillating voltage occurs due to the stray capacitance Cps. Therefore, the stray capacitance Cps is taken into account as described below.

<Description of Operation Around Rated Load>

FIG. 2 shows the operational time sequence of each section of the resonant switching power supply device 100 of FIG. 1. In FIG. 2, the reference symbol VQH represents the drain-source voltage of the high-side switching element QH, IQH the current flowing through the switching element QH (the negative value of current indicates the flow of current through the diode DQH), VQL the drain-source voltage of the low-side switching element QL, IQL the current flowing through the switching element QL (the negative value of current indicates the flow of current through the diode DQL), VCri the voltage of the current resonant capacitor Cri, VD1 the voltage of the diode D1, ID1 the current of the diode D1, VD2 the voltage of the diode D2, and ID2 the current of the diode D2. the operational waveforms of other parts are not illustrated in the diagram.

(Until Time t0)

Immediately before time t0 when the switching element QH is on, a current is flowing through the following path at the primary side of the transformer T1: the positive terminal of the input direct-current power source Vin→the switching element QH→the inductance Lr→the primary winding N1 of the transformer→the current resonant capacitor Cri→the negative terminal of the input direct-current power source Vin. At the secondary side of the transformer T1, a current is flowing through the following path: one terminal (positive terminal) of the smoothing capacitor Co→the resistance Ro of the load Ld→the other terminal (negative terminal) of the smoothing capacitor Co. At time t0, the switching element QH is switched off.

(Time t0 to t1)

After the switching element QH is turned off, the current IQH becomes 0; the current flowing at the primary side of the transformer T1 is diverted from the switching element QH to the voltage resonant capacitor Crv. The current then flows through the following path: the voltage resonant capacitor Crv→the inductance Lr→the primary winding N1 of the transformer→the current resonant capacitor Cri→the voltage resonant capacitor Crv.

Therefore, the voltage resonant capacitor Crv is discharged to 0V even though the voltage resonant capacitor Crv has a voltage substantially equal to that of the input direct-current power source Vin when the switching element QH is on.

Since the voltage of the voltage resonant capacitor Crv is equal to the voltage VQL of the switching element QL, the voltage VQL of the switching element QL also drops from the input direct-current power source Vin to 0V. At this time, the voltage VQH of the switching element QH rises from 0V to Vin because the voltage VQH is equal to the difference between the voltage of the input direct-current power source Vin and the voltage VQL of the switching element QL.

(Time t1 to t2)

During the period from time t1 to t2, after the voltage of the voltage resonant capacitor Crv decreases to 0V at time t1, the diode DQL that is connected in anti-parallel to the switching element QL becomes conductive. Therefore, a current flows through the following path: the diode DQL→the inductance Lr→the primary winding N1 of the transformer→the current resonant capacitor Cri→the diode DQL. The current becomes 0 at time t2. During the period from time t1 to t2, because the gate signal of the switching element QL is turned on, the switching element QL carries out a zero voltage switching (ZVS) and a zero current switching (ZCS) operation.

The voltage of the secondary winding N3 of the transformer T1 reaches the output voltage Vo. At the secondary side of the transformer T1, a current flows through the following path: one terminal (positive terminal) of the smoothing capacitor Co→the resistance Ro of the load Ld→the other terminal (negative terminal) of the smoothing capacitor Co. A current also flows through the following path: the secondary winding N3 of the transformer T1→the diode D2→the smoothing capacitor Co→the secondary winding N3 of the transformer T1.

(Time t2 to t3)

During the period from time t2 to t3, since the switching element QL is on at time t2, a current flows through the following path: the current resonant capacitor Cri→the primary winding N1 of the transformer→the inductance Lr→the switching element QL→the current resonant capacitor Cri. The voltage VCri of the current resonant capacitor Cri drops. At the secondary side of the transformer T1, a current flows through the following path: the secondary winding N3 of the transformer T1→the diode D2→the smoothing capacitor Co→the secondary winding N3 of the transformer T1. A current also flows through the following path: one terminal (positive terminal) of the smoothing capacitor Co→the resistance Ro of the load Ld→the other terminal (negative terminal) of the smoothing capacitor Co. The voltage of the secondary winding N3 is clamped at the voltage of the output voltage Vo; the voltage of the primary winding N1 is clamped at the voltage of the turn ratio of the output voltage Vo. Accordingly, at the primary side of the transformer T1, a resonant current flows thanks to the reactor Lr and the current resonant capacitor Cri.

(Time t3 to t4)

During the period from time t3 to t4, the voltage of the secondary winding N3 becomes less than or equal to the output voltage Vo at time t3 and the secondary-side current of the transformer T1 vanishes. At the secondary side of the transformer T1, a current flows through the following path: one terminal (positive terminal) of the smoothing capacitor Co→the resistance Ro of the load Ld→the other terminal (negative terminal) of the smoothing capacitor Co. At the primary side of the transformer T1, a current flows through the following path: the current resonant capacitor Cri→the primary winding N1 of the transformer→the inductance Lr→the switching element QL→the current resonant capacitor Cri. At the primary side of the transformer T1, a resonant current flows thanks to the sum (Lr+Lp) of the reactor Lr and the excitation inductance Lp of the transformer's primary winding N1 and the current resonant capacitor Cri.

(Time t4 to t5)

During the period from time t4 to t5, after the switching element QL is turned off at time t4, the current flowing at the primary side of the transformer T1 is diverted from the switching element QL to the voltage resonant capacitor Crv. A current then flows through the following path: the primary winding N1 of the transformer→the inductance Lr→the voltage resonant capacitor Crv→the current resonant capacitor Cri→the primary winding N1 of the transformer.

Accordingly, the voltage resonant capacitor Crv is charged to the voltage of the input direct-current power source Vin even though the voltage of the voltage resonant capacitor Crv is substantially 0 V at a time when the switching element QL is on. Since the voltage of the voltage resonant capacitor Crv is equal to the voltage VQL of the switching element QL, the voltage of the switching element QL goes up from 0 V to Vin. Moreover, since the voltage VQH of the switching element QH is equal to the difference between the voltage of the input direct-current power source Vin and the voltage VQL of the switching element QL, the voltage VQH of the switching element QH goes down from the voltage of the input direct-current power source Vin to 0 V.

(Time t5 to t6)

During the period from time t5 to t6, after the voltage of the voltage resonant capacitor Crv rises to the voltage of the input direct-current power supply Vin at time t5, the diode DQH that is connected in anti-parallel to the switching element QH becomes conductive. Therefore, a current flows through the following path: the primary winding N1 of the transformer→the inductance Lr→the diode DQH→the input direct-current power source Vin→the current resonant capacitor Cri→the primary winding N1 of the transformer. The current becomes 0 at time t6. During the period from time t5 to t6, because the gate signal of the switching element QH is turned on, the switching element QH carries out a zero voltage switching and a zero current switching operation.

The voltage of the secondary winding N2 of the transformer T1 reaches the output voltage Vo. At the secondary side of the transformer T1, a current flows through the following path: one terminal (positive terminal) of the smoothing capacitor Co→the resistance Ro of the load Ld→the other terminal (negative terminal) of the smoothing capacitor Co. A current also flows through the following path: the secondary winding N2 of the transformer T1→the diode D1→the smoothing capacitor Co→the secondary winding N2 of the transformer T1.

(Time t6 to t7)

During the period from time t6 to t7, since the switching element QH is on at time t6, a current flows through the following path: the input direct-current power source Vin→the switching element QH→the inductance Lr→the primary winding N1 of the transformer→the current resonant capacitor Cri→the input direct-current power source Vin. Meanwhile, the voltage VCri of the current resonant capacitor Cri rises. At the secondary side of the transformer T1, a current flows through the following path: the secondary winding N2 of the transformer T1→the diode D1→the smoothing capacitor Co→the secondary winding N2 of the transformer T1. A current also flows through the following path: one terminal (positive terminal) of the smoothing capacitor Co→the resistance Ro of the load Ld→the other terminal (negative terminal) of the smoothing capacitor Co. The voltage of the secondary winding N2 is clamped at the voltage of the output voltage Vo; the voltage of the primary winding N1 is clamped at the voltage of the turn ratio of the output voltage Vo. Accordingly, at the primary side of the transformer T1, a resonant current flows thanks to the reactor Lr and the current resonant capacitor Cri.

(Time t7 to t8)

During the period from time t7 to t8, the voltage of the secondary winding N2 becomes less than or equal to the output voltage Vo at time t7 and the secondary-side current of the transformer T1 vanishes. At the secondary side of the transformer T1, a current flows through the following path: one terminal (positive terminal) of the smoothing capacitor Co→the resistance Ro of the load Ld→the other terminal (negative terminal) of the smoothing capacitor Co. At the primary side of the transformer T1, a current flows through the following path: the input direct-current power source Vin→the switching element QH→the inductance Lr→the primary winding N1 of the transformer→the current resonant capacitor Cri→the input direct-current power source Vin. At the primary side of the transformer T1, a resonant current flows thanks to the sum (Lr+Lp) of the reactor Lr and the excitation inductance Lp of the transformer's primary winding N1 and the current resonant capacitor Cri.

As described above, the conventional direct-current conversion device uses pulse signals whose on-duty is substantially set at 50%; controls the switching frequency of the switching elements QH and QL; changes the resonant current caused by the reactor Lr, the excitation inductance Lp and the current resonant capacitor Cri; and controls the output voltage Vo. Therefore, the output voltage Vo goes down as the switching frequency is raised.

<Description of Operation with No Load>

The following describes the operation when there is no load. Here, as shown in FIG. 3, the stray capacitance Cps that exists between the primary winding N1 and secondary windings N2 and N3 of the transformer T1 is moved to the input side of the primary winding N1 of the transformer T1 (indicated by Cps' in FIG. 3) in order to examine the operation with no load. The examination is made with a circuit shown in FIG. 4 that is equivalent to the circuit of FIG. 3. In FIG. 4, the reference symbols Lr1 and Lr2 represent the primary leakage inductance and secondary leakage inductance of the transformer T1, respectively, LP the excitation inductance of the transformer T1, and Cps' the stray capacitance, all converted into the primary side of the transformer T1. Moreover, the transformer T1 is replaced with an ideal transformer T1'. Incidentally, since the conversion of the transformer's impedance to the primary side is well known, the conversion will not be described here in detail. When the reactor Lr is connected in series to the primary winding N1 of the transformer T1, the sum of the reactor Lr and the primary leakage inductance is regarded as Lr1. The switching elements QH and QL are replaced with simple switches that include the diodes DQH and DQL in the diagram. FIG. 5 shows the operational time sequence of each section of the circuit shown in FIG. 4 that is equivalent to the resonant switching power supply device 100, in which case there is no load. The types of operational waveform shown in FIG. 5 are the same as those of FIG. 2.

In the equivalent circuit of FIG. 4, for example, the current paths that are formed when the switching element QH is on during the period of time t5 to t8 as illustrated in FIG. 5 (equivalent to the period of time t5 to t8 in FIG. 2) are: a current path A (current ia), indicated by alternate long and short dash line, that passes through the excitation inductance Lp of the transformer T1'; and a current path B (current ib) that passes through the stray capacitance Cps'.

On the current path A that passes through the excitation inductance Lp of the transformer T1', resonance occurs thanks to the sum of the leakage inductance Lr1 of the transformer's primary winding and the excitation inductance Lp and the current resonant capacitor Cri. On the current path B that passes through the stray capacitance Cps', resonance occurs thanks to the leakage inductance Lr1+Lr2 (the sum of the leakage inductance Lr1 of the transformer's primary winding and the leakage inductance Lr2 of the transformer's secondary winding) and the stray capacitance Cps'.

When the resonant switching power supply device 100 operates around the rated load, a small load resistance value Ro can be considered as being connected in parallel to the stray capacitance Cps' in terms of an equivalent circuit. Therefore, when consideration is given to the resonance phenomenon between the leakage inductance Lr1+Lr2 and the stray capacitance Cps', the power loss of the formed resonant circuit is large and it is difficult for any oscillatory phenomenon to take place in the circuit. When the resonant switching power supply device 100 operates with no load, the transformer T1' is open in terms of an equivalent circuit. Therefore, a load resistance value Ro connected to the stray capacitance Cps' becomes infinite. Therefore, when consideration is given to the resonance phenomenon between the leakage inductance Lr1+Lr2 and the stray capacitance Cps', the power loss of the formed resonant circuit is small and it is easy for an oscillatory phenomenon to take place in the circuit.

The relationship between the values Lr1, Lr2, Lp, Cri and Cps' is usually as follows:

$$Lr1+Lp >> Lr1+Lr2$$

$$Cri >> Cps'$$

Therefore, the period of the resonance caused by the leakage inductance Lr1 of the transformer's primary winding, the excitation inductance Lp and the current resonant capacitor Cri is longer than the period of the resonance caused by the leakage inductance Lr1+Lr2 and the stray capacitance Cps'.

Accordingly, when the power supply device operates with no load, a resonance phenomenon whose period is long occurs thanks to the sum of the leakage inductance Lr1 of the transformer's primary winding and the excitation inductance Lp and the current resonance capacitor Cri on the current path A that passes through the excitation inductance Lp of the transformer T1'; on the current path B that passes through the stray capacitance Cps', the resonance phenomenon whose period is short occurs thanks to the leakage inductance Lr1+Lr2 and the stray capacitance Cps'. Therefore, the waveform of the current passing through the excitation inductance Lp of the transformer T1' and the current passing through the stray capacitance Cps' combined is the one generated by superimposing an oscillating current whose period is short that passes through the stray capacitance Cps' on a current whose period is long that passes through the excitation inductance Lp of the transformer T1', such as the waveform of IQL during the period t1 to t4 in FIG. 5 or the waveform of IQH during the period t5 to t8.

It is clear from FIG. 5, which shows the operational waveforms of the secondary-side diodes D1 and D2 of the transformer T1, that the voltage VD1 across the diodes D1 and D2 is also oscillating due to the oscillating current caused by the leakage inductances Lr1 and Lr2 and the stray capacitance Cps'. Therefore, when the secondary-side load is light, the output voltage increases as the secondary-side smoothing capacitor Co is charged to the peak due to the oscillating voltage. The problem is that the PFM control, which is aimed at reducing the increase in the voltage, leads to an increase in switching frequency.

FIG. 6 shows an example of a case where an electrostatic shield plate S1 is put between the primary and secondary windings of a transformer T2 according to a conventional technique. In this case, the electrostatic shield plate S1 is connected to a connection point where the negative terminal of the input direct-current power source Vin and the current resonant capacitor Cri are connected (i.e. the terminal of the current resonant capacitor Cri that is situated at the side opposite to where the primary winding N1 of the transformer T2 and the current resonant capacitor Cri are connected). Therefore, as described below, the electrostatic shield plate S1 does not play a role in reducing the oscillation that is superimposed on the output voltage.

Thanks to the electrostatic shield plate S1 that is inserted, the stray capacitance between the primary winding N1 and the secondary windings N2 and N3 is divided into two, Cps1 and Cps2, as illustrated in FIG. 6; the stray capacitance Cps1 and the stray capacitance Cps2 are connected in series. Meanwhile, the series structure of the leakage inductances Lr1 ad Lr2 and the stray capacitances Cps1 and Cps2 remains unchanged. FIG. 7 shows an equivalent circuit thereof; Cps1' and Cps2' represent the results of conversion of Cps1 and Cps2 to the primary side of the transformer T2. The transformer T2 is replaced with an ideal transformer T2'. In FIG. 7, the same reference symbols as those of FIG. 4 represent the same components. The structure of FIG. 7 is different from that of FIG. 4 in that there are two stray capacitances Cps1' and Cps2' because of division and the middle point between the stray capacitances Cps1' and Cps2' is connected to the negative-side terminal of the input direct-current power source Vin (i.e. the terminal of the current resonant capacitor Cri that is situated at the side opposite to where the primary winding N1 of the transformer T2 and the current resonant capacitor Cri are connected). In this case, the resonant current caused by the leakage inductance Lr1+Lr2 and the stray capacitance Cps1' flows through a current path C shown in FIG. 7 (indicated by alternate long and short dash line). Since the stray capacitance Cps1' is charged with the power supply voltage Vin thanks to the current, a large amount of energy is accumulated. The input direct-current power source Vin, the leakage inductances Lr1 and Lr2 and the stray capacitance Cps1' turn out to be a series circuit and thus form a resonant circuit. Therefore, the voltage applied to the stray capacitance Cps1' is greater than or equal to the input direct-current voltage Vin. The voltage applied to the primary winding N1 of the transformer T1 is calculated by subtracting the voltage applied to the current resonant capacitor Cri from the voltage applied to the stray capacitance Cps1'. Therefore, it is clear that the voltage associated with resonance that is applied to the stray capacitance Cps1' also affects the primary winding N1 of the transformer T1.

FIG. 8 shows operational waveforms when there is no load. The operational waveforms shown in FIG. 8 are substantially the same as those shown in FIG. 5. An oscillating current caused by the leakage inductances Lr1 and Lr2 and the stray capacitance Cps1' is returned to the negative terminal of the input direct-current power source Vin through the electrostatic shield plate S1 (i.e. toward the terminal of the current resonant capacitor Cri that is situated at the side opposite to where the primary winding N1 of the transformer T2 and the current resonant capacitor Cri are connected). Therefore, the current does not flow through the resonant capacitance Cri and the waveform of ICri improves. However, it is not possible to prevent the increase of the output voltage because the oscillating voltage that emerges on the secondary-side winding remains unchanged. Therefore, with the configuration of the conventional technique, it is not possible to reduce an increase in switching frequency when the load is light.

SUMMARY OF THE INVENTION

The object of the present invention is, in view of the above problems, to provide a resonant switching power supply device that can reduce a common mode noise as well as an increase in frequency when the load is light.

According to the present invention, a resonant switching power supply device equipped with a PFM control circuit to control a switching frequency in such a way that an output voltage is brought to a desired value includes: a resonant circuit where a primary winding of a transformer and a current resonant capacitor are connected in series; a rectifying circuit that is connected to a secondary winding of the transformer and obtains the output voltage; and an electrostatic shield plate disposed between the primary winding and secondary winding of the transformer, the electrostatic shield plate being connected to a terminal of the primary winding of the transformer that is situated at the side opposite to where the current resonant capacitor is connected.

Moreover, according to the present invention, a resonant switching power supply device equipped with a PFM control circuit to control a switching frequency in such a way that an output voltage is brought to a desired value includes: a resonant circuit where a primary winding of a transformer, a current resonant capacitor and a reactor are connected in series; a rectifying circuit that is connected to a secondary winding of the transformer and obtains the output voltage; and an electrostatic shield plate disposed between the primary winding and secondary winding of the transformer, the reactor being connected to one terminal of the primary winding of the transformer and the current resonant capacitor being connected to the other terminal of the primary winding of the transformer, the electrostatic shield plate being connected to a terminal of the reactor that is situated at the side opposite to where the primary winding of the transformer is connected.

Furthermore, according to the present invention, the transformer of the resonant switching power supply device may be a leakage transformer.

Furthermore, according to the present invention, the resonant circuit of the resonant switching power supply device may be connected to both ends of a low-side switching element of a half bridge circuit where a high-side switching element and the low-side switching element are connected in series.

Furthermore, according to the present invention, the resonant circuit of the resonant switching power supply device may be connected to both ends of a high-side switching element of a half bridge circuit where the high-side switching element and a low-side switching element are connected in series.

Furthermore, according to the present invention, the resonant circuit of the resonant switching power supply device may be connected between a connection point where a first high-side switching element and first low-side switching element of a full bridge circuit in which a series structure of the first high-side switching element and the first low-side switching element and a series structure of a second high-side switching element and a second low-side switching element are connected across an input direct-current power source are connected and a connection point where the second high-side switching element and the second low-side switching element are connected.

According to the present invention, it is possible to reduce a common mode noise as well as an increase in frequency when the load is light.

BRIEF DESCRIPTION OF THE DRAWINGS

FIG. 3 is a diagram showing the circuit configuration of the conventional resonant switching power supply device shown in FIG. 1 when a stray capacitance is moved to the primary side;

FIG. 4 is a diagram showing an equivalent circuit of the conventional resonant switching power supply device shown in FIG. 3;

DETAILED DESCRIPTION OF THE PREFERRED EMBODIMENTS

The following describes in detail embodiments of the present invention with reference to the accompanying drawings.

First Embodiment

Figure 9:
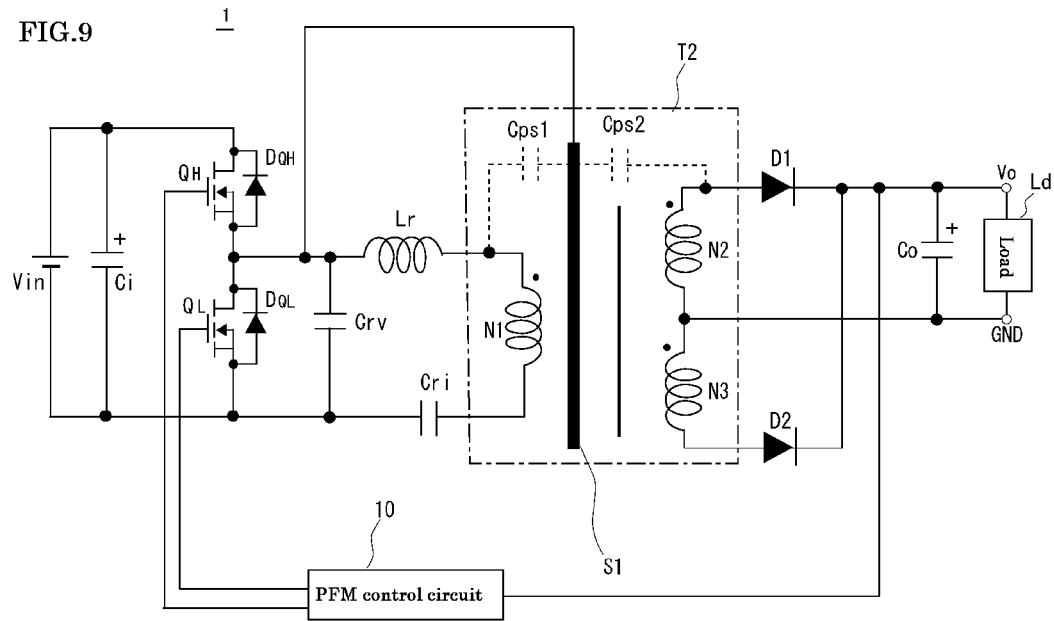
FIG. 9 is a diagram showing the circuit configuration of a resonant switching power supply device according to a first embodiment of the present invention.

FIG. 9 is a diagram showing the circuit configuration of a resonant switching power supply device 1 according to a first embodiment of the present invention.

Figure 6:
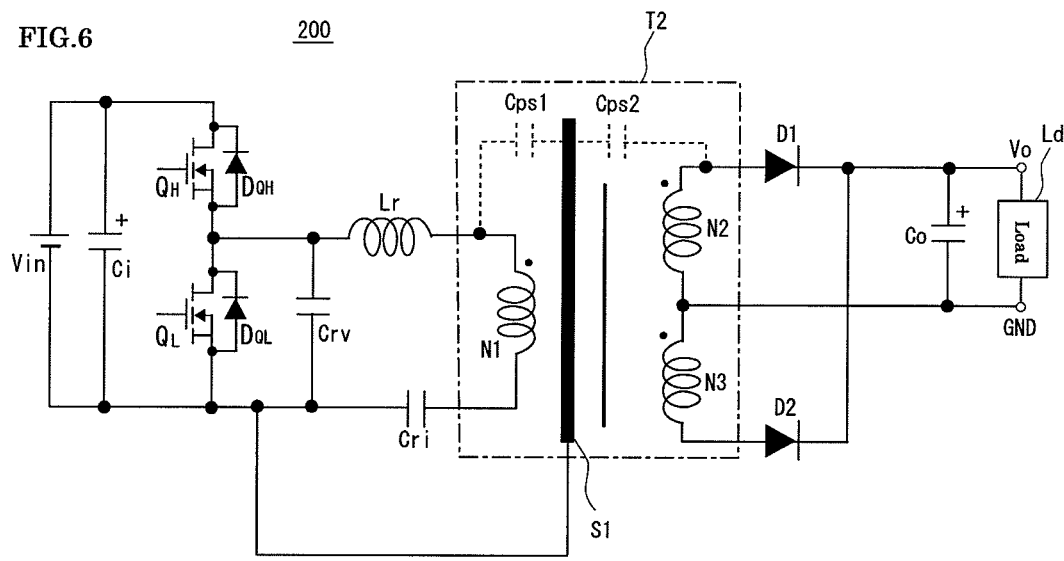
FIG. 6 is a diagram illustrating the circuit configuration of a conventional resonant switching power supply device when an electrostatic shield plate is provided for a transformer.

The conventional technique shown in FIG. 6 is aimed at reducing a common mode noise by connecting the electrostatic shield plate S1 to the negative-terminal side of the input direct-current power source Vin (i.e. the terminal of the current resonant capacitor Cri that is situated at the side opposite to where the primary winding N1 of the transformer T2 and the current resonant capacitor Cri are connected). The present embodiment is aimed at reducing an increase in switching frequency when a load is light by connecting the electrostatic shield plate S1 to a connection point where the source terminal of the switching element QH, the drain terminal of the switching element QL, one terminal of the reactor Lr and one terminal of the voltage resonant capacitor are connected (i.e. the terminal of the reactor Lr that is situated at the side opposite to where the primary winding N1 of the transformer T2 and the reactor Lr are connected).

Incidentally, the use of a leakage transformer for the transformer T2 is preferable because the primary leakage inductance can be used as the reactor Lr. When the leakage transformer is used, it is not necessary for the reactor Lr to be connected in series to the primary winding N1. However, when the reactor Lr is connected in series to the primary winding N1, the sum of the primary leakage inductance of the transformer T2 and the value of the inductance of the reactor Lr is regarded as the primary-side inductance value Lr1. When the reactor Lr is formed only by the leakage inductance of the transformer T2, the electrostatic shield plate S1 is then connected to the terminal of the primary winding N1 that is situated at the side opposite to where the primary winding N1 of the transformer T2 and the current resonant capacitor Cri are connected.

In FIG. 9, the same reference symbols as those of FIG. 6, which illustrate the conventional technique, denote the same components. The way the electrostatic shield plate S1 is connected in the resonant switching power supply device 1 of the present embodiment shown in FIG. 9 is different from that of the conventional resonant switching power supply device 200 shown in FIG. 6, while the rest is the same in configuration. Here, the focus will be mainly put on the different point and those having the same configuration will be described when necessary.

In FIG. 9, the electrostatic shield plate S1 disposed between the primary winding N1 and secondary windings N2 and N3 of the transformer T2 has the stray capacitance Cps1 between the primary winding N1 of the transformer T2 and the electrostatic shield plate S1 as well as the stray capacitance Cps2 between the secondary windings N2 and N3 of the transformer T2 and the electrostatic shield plate S1. An electric line connected to a portion of the electrostatic shield plate S1 is connected to a connection point where the source terminal of the switching element QH, the drain terminal of the switching element QL, one terminal of the reactor Lr and one terminal of the voltage resonant capacitor Crv are connected (i.e. the terminal of the reactor Lr that is situated at the side opposite to where the primary winding N1 of the transformer T2 and the reactor Lr are connected).

Figure 7:
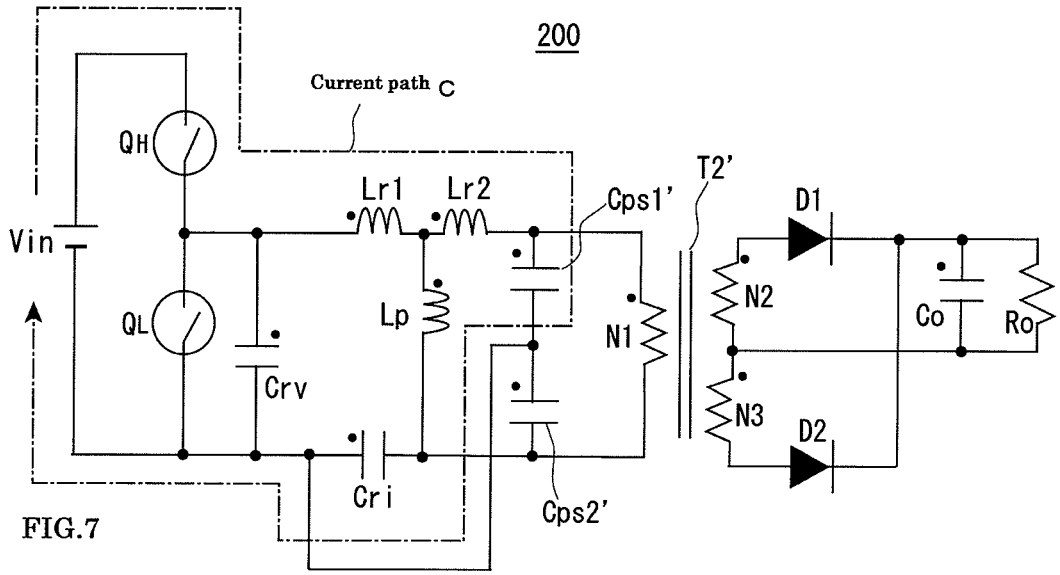
FIG. 7 is a diagram showing an equivalent circuit of the conventional resonant switching power supply device shown in FIG. 6.
Figure 10:
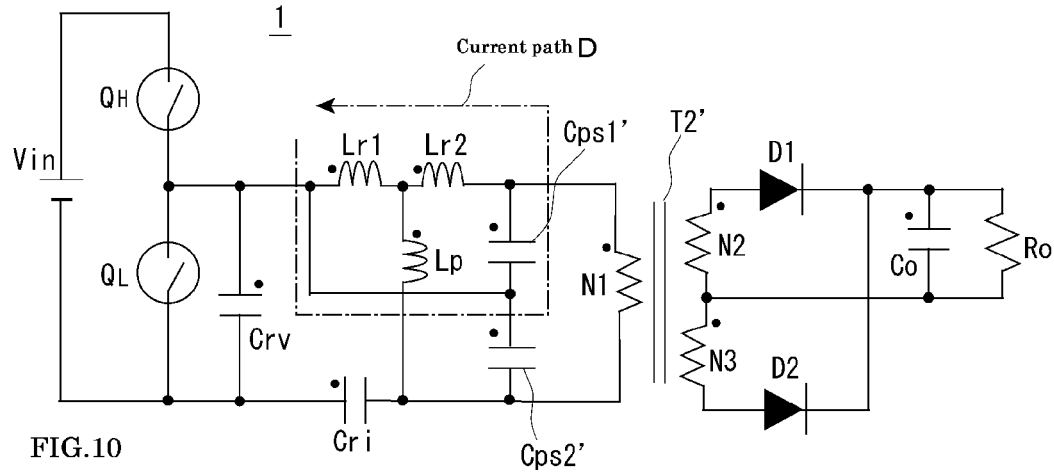
FIG. 10 is a diagram showing an equivalent circuit of the resonant switching power supply device according to the first embodiment of the present invention.

FIG. 10 shows an equivalent circuit of the present embodiment as well as a current path. The equivalent circuit of the present embodiment and the equivalent circuit of the conventional technique shown in FIG. 7 are the same in that there are two stray capacitances Cps1' and Cps2' because of division and the stray capacitances Cps1' and Cps2' are connected between the terminals of the primary winding N1 of the transformer T2. According to the conventional technique, a connection point where the stray capacitances Cps1' and Cps2' are connected is connected to the negative terminal of the input direct-current power source Vin (i.e. the terminal of the current resonant capacitor Cri that is situated at the side opposite to where the primary winding N1 of the transformer T2 and the current resonant capacitor Cri are connected). On the other hand, according to the present embodiment, the connection point where the stray capacitances Cps1' and Cps2' are connected is connected to a connection point where the source terminal of the switching element QH, the drain terminal of the switching element QL, one terminal of the leakage inductance Lr1 and one terminal of the voltage resonant capacitor are connected (i.e. the terminal of the leakage inductance Lr1 that is situated at the side opposite to where the leakage inductance Lr1 and the leakage inductance Lr2 are connected). Moreover, the transformer T2 is replaced with an ideal transformer T2'.

In this manner, the electrostatic shield plate S1 is connected to the connection point where the source terminal of the switching element QH, the drain terminal of the switching element QL, one terminal of the leakage inductance Lr1 and one terminal of the voltage resonant capacitor are connected (i.e. the terminal of the leakage inductance Lr1 that is situated at the side opposite to where the leakage inductance Lr1 and the leakage inductance Lr2 are connected). Therefore, as shown in FIG. 10, the leakage inductance Lr1+Lr2 and the stray capacitance Cps1' form a parallel circuit; a resonant current caused by the leakage inductance Lr1+Lr2 and the stray capacitance Cps1' flows through a current path D indicated by alternate long and short dash line. At this time, the voltage applied to the stray capacitance Cps1' is equal to the sum of the voltage that occurs at the leakage inductance Lr1 and the voltage at the leakage inductance Lr2; the figure is extremely smaller than that of the power supply voltage Vin. Accordingly, a smaller amount of energy is accumulated in the stray capacitance Cps. The oscillating voltage caused by the resonance of the leakage inductance Lr1+Lr2 and the stray capacitance Cps1', in turn, becomes smaller, making it possible to reduce the increase of the voltage of the transformer's secondary-side circuit resulting from the effects of the oscillating voltage.

Figure 8:
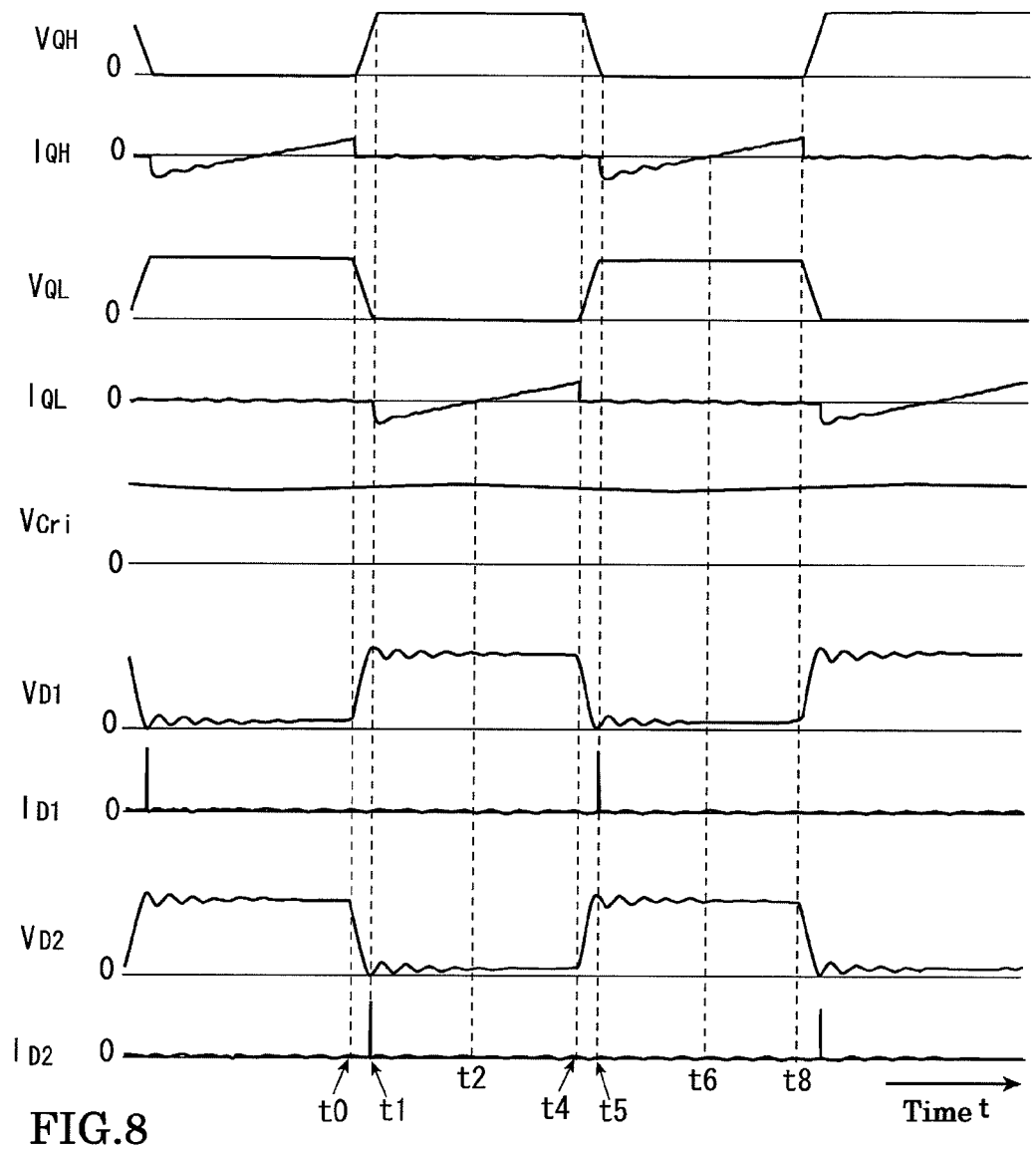
FIG. 8 is a diagram showing an operational sequence (when there is no load) of the conventional resonant switching power supply device shown in FIG. 6.
Figure 11:
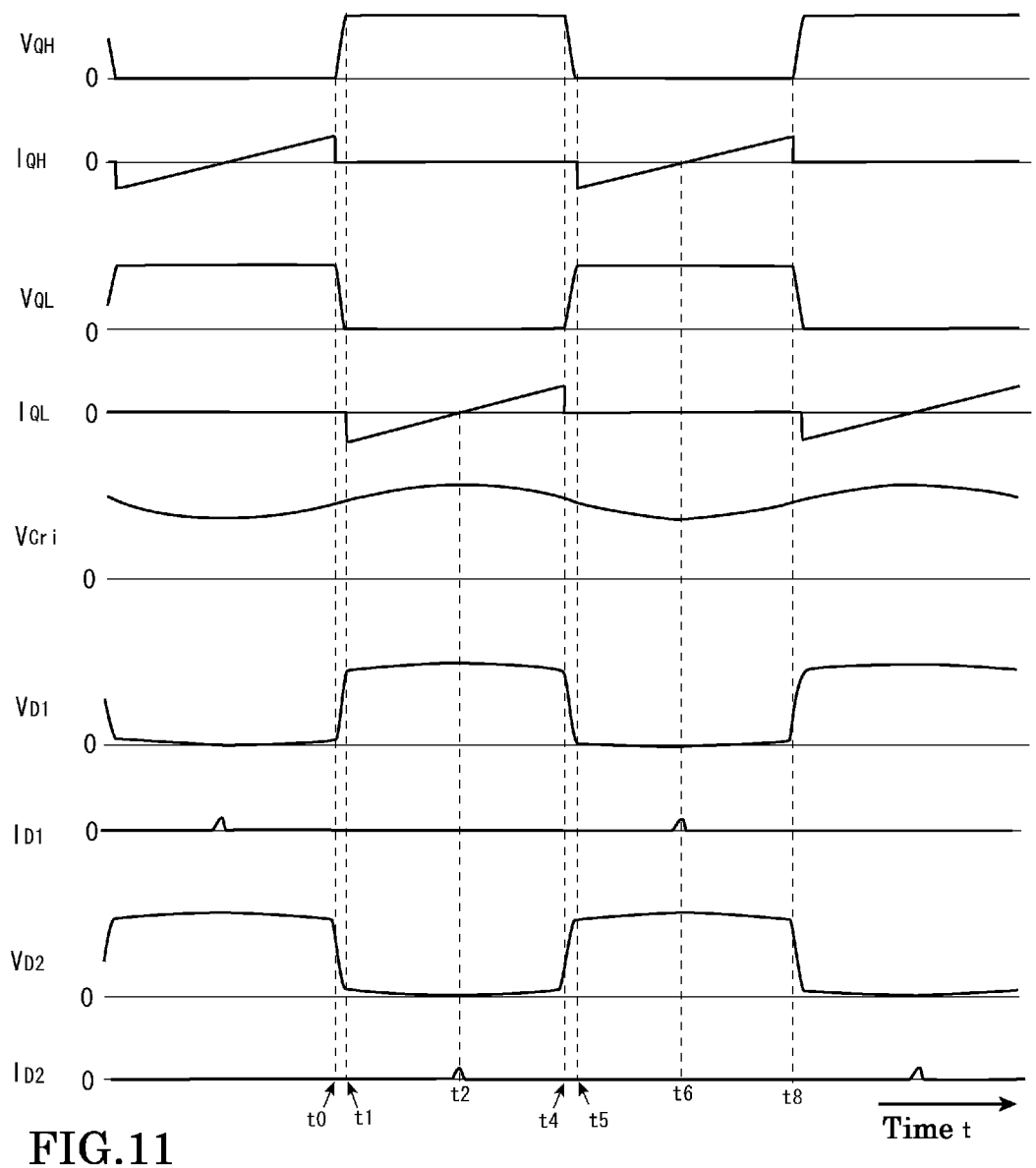
FIG. 11 is a diagram showing an operational sequence (when there is no load) of the resonant switching power supply device according to the first embodiment of the present invention.

FIG. 11 shows operational waveforms when there is no load according to the present embodiment. The types of operational waveform shown in FIG. 11 are the same as those of FIG. 8. The operational waveforms shown in FIG. 11 are compared with those of the conventional technique shown in FIG. 8. Even though the oscillating current and voltage emerge due to the leakage inductances Lr1 and Lr2 and the stray capacitance Cps1' according to the conventional technique, such an oscillating current and voltage are not observed both at the primary and secondary sides of the transformer according to the present embodiment. Therefore, the present embodiment is free from such problems as the increase of the output voltage caused by the secondary-side smoothing capacitor Co that is charged to the peak by the oscillating voltage or the increase of the switching frequency caused by the PFM control aimed at reducing the increase of the voltage.

Second Embodiment

Figure 12:
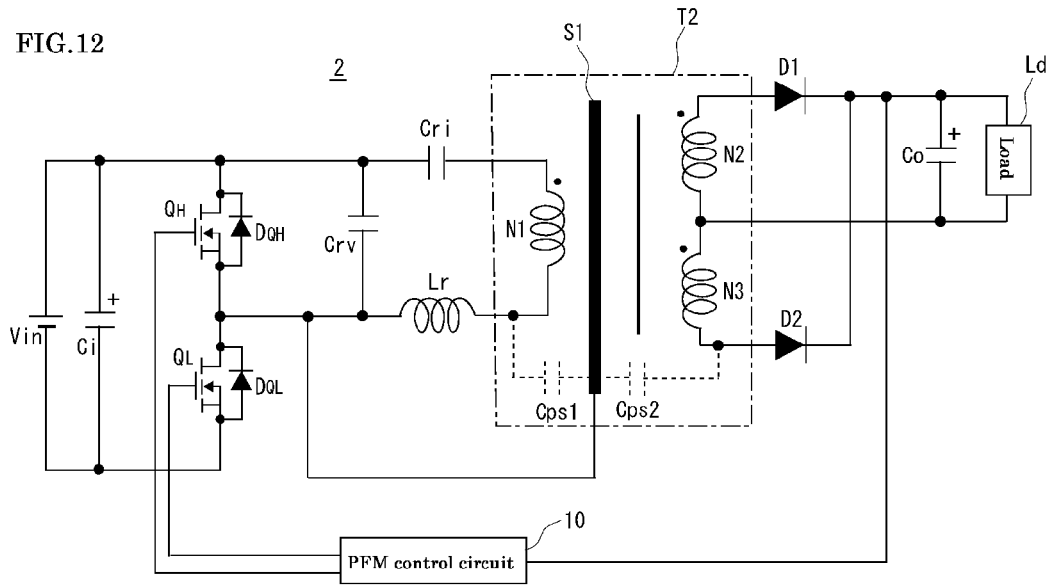
FIG. 12 is a diagram showing the circuit configuration of a resonant switching power supply device according to a second embodiment of the present invention.

FIG. 12 is a diagram showing the circuit configuration of the resonant switching power supply device 2 according to a second embodiment of the present invention.

When being compared with the resonant switching power supply device 1 of the first embodiment shown in FIG. 9, the resonant switching power supply device 2 shown in FIG. 12 has a resonant circuit connected between the drain and source terminals of the high-side switching element QH, not to the low-side switching element QL: the resonant circuit consists of the voltage resonant capacitor Crv, the current resonant capacitor Cri, the primary winding N1 of the transformer T2 and the reactor Lr. The rest is the same in configuration as the resonant switching power supply device 1 shown in FIG. 9.

Like the resonant switching power supply device 1 of the first embodiment shown in FIG. 9, the electrostatic shield plate S1 disposed between the primary winding N1 and secondary windings N2 and N3 of the transformer T2 has the stray capacitance Cps1 between the primary winding N1 of the transformer T2 and the electrostatic shield plate S1 as well as the stray capacitance Cps2 between the secondary windings N2 and N3 of the transformer T2 and the electrostatic shield plate S1. An electric line connected to a portion of the electrostatic shield plate S1 is connected to a connection point where the source terminal of the switching element QH, the drain terminal of the switching element QL, one terminal of the reactor Lr and one terminal of the voltage resonant capacitor Crv are connected (i.e. the terminal of the reactor Lr that is situated at the side opposite to where the primary winding N1 of the transformer T2 and the reactor Lr are connected).

Even in this case, as in the case of the resonant switching power supply device 1 of the first embodiment shown in FIG. 9, when illustrated with an equivalent circuit, the leakage inductance Lr1+Lr2 and the stray capacitance Cps1' form a parallel circuit, as does the equivalent circuit of FIG. 10; what is formed is a current path that is similar to the current path D indicated by alternate long and short dash line in FIG. 10. The resonant current caused by the leakage inductance Lr1+Lr2 and the stray capacitance Cps1' flows through the current path. At this time, the voltage applied to the stray capacitance Cps1' is equal to the sum of the voltage that occurs at the leakage inductance Lr1 and the voltage at the leakage inductance Lr2; the figure is extremely smaller than that of the power supply voltage Vin. Accordingly, as in the case of the first embodiment, a smaller amount of energy is accumulated in the stray capacitance Cps1'. The oscillating voltage caused by the resonance of the leakage inductance Lr and the stray capacitance Cps1', in turn, becomes smaller, making it possible to reduce the increase of the voltage of the transformer's secondary-side circuit resulting from the effects of the oscillating voltage. Thus, it is possible to reduce the increase of the switching frequency of the resonant switching power supply device 2 when there is no load.

Third Embodiment

Figure 13:
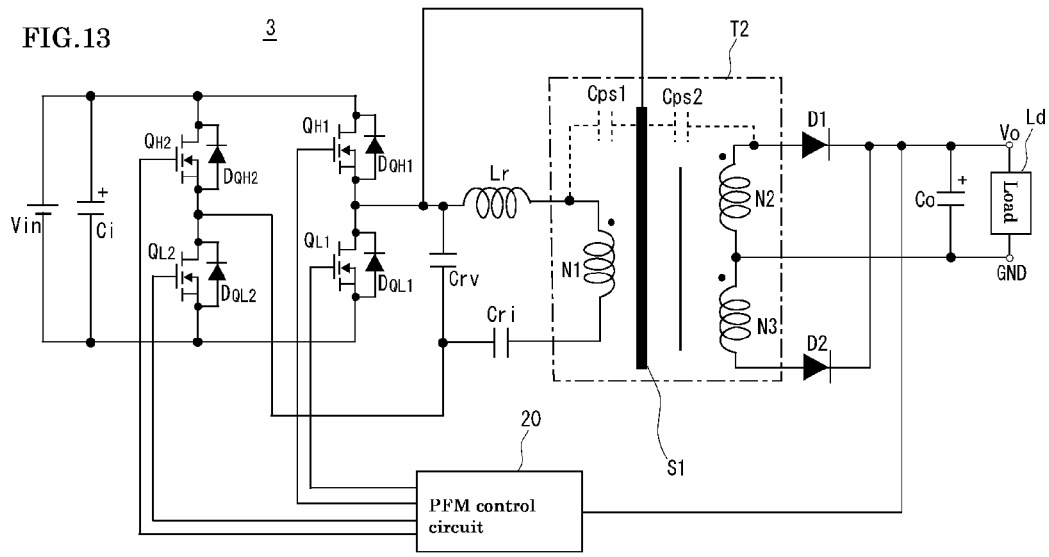
FIG. 13 is a diagram showing the circuit configuration of a resonant switching power supply device according to a third embodiment of the present invention.

FIG. 13 is a diagram showing the circuit configuration of a resonant switching power supply device 3 according to a third embodiment of the present invention.

The resonant switching power supply device 3 of FIG. 13 and the resonant switching power supply device 1 of the first embodiment shown in FIG. 9 are different in that the resonant switching power supply device 3 adopts the configuration of a full bridge circuit. That is, a series structure of switching elements QH1 and QL1 and a series structure of switching elements QH2 and QL2 are connected in parallel to both ends of the input direct-current power source Vin; a resonant circuit is connected between a connection point where the source terminal of the switching element QH1 and the drain terminal of the switching element QL1 are connected and a connection point where the source terminal of the switching element QH2 and the drain terminal of the switching element QL2 are connected.

The following describes the circuit configuration of the resonant switching power supply device 3 shown in FIG. 13.

In the resonant switching power supply device 3 shown in FIG. 13, the reference symbol Ci represents a smoothing capacitor, Cri a current resonant capacitor, Co a smoothing capacitor, Crv a voltage resonant capacitor, QH1 and QH2 high-side switching elements that are N-channel MOSFETs, QL1 and QL2 low-side switching elements that are N-channel MOSFETs, DQH1, DQH2, DQL1, DQL2, D1 and D2 diodes, Lr a reactor, T2 a transformer, N1 a primary winding of the transformer T2, N2 a secondary winding of the transformer T2, N3 a secondary winding of the transformer T2, and Ld a load. The reference symbol S1 represents an electrostatic shield plate disposed between the primary winding N1 and secondary windings N2 and N3 of the transformer T2. The reference symbol Cps1 denotes a stray capacitance between the primary winding N1 of the transformer T2 and the electrostatic shield plate S1, and Cps2 a stray capacitance between the secondary windings N2 and N3 of the transformer T2 and the electrostatic shield plate S1. The reference numeral 20 denotes a PFM control circuit that controls an output voltage. The reference symbol Vin represents an input direct-current power source.

The resonant switching power supply device 3 adopts the configuration of a full bridge circuit. The smoothing capacitor Ci is connected to both ends of the input direct-current power source Vin. The drain terminals of the switching elements QH1 and QH2 are connected to the positive terminal of the input direct-current power source Vin, and the source terminals of the switching elements QL1 and QL2 to the negative terminal of the input direct-current power source Vin.

The source terminal of the switching element QH1 and the drain terminal of the switching element QL1 are connected; the source terminal of the switching element QH2 and the drain terminal of the switching element QL2 are connected. The voltage resonant capacitor Crv is connected in parallel between a connection point where the source terminal of the switching element QH1 and the drain terminal of the switching element QL1 are connected and a connection point where the source terminal of the switching element QH2 and the drain terminal of the switching element QL2 are connected; a resonant circuit consisting of the current resonant capacitor Cri, the primary winding N1 of the transformer T2 and the reactor Lr is connected.

The diodes DQH1 is connected between the drain and source of the switching element QH1, the diode DQH2 between the drain and source of the switching element QH2, the diode DQL1 between the drain and source of the switching element QL1, and the diode DQL2 between the drain and source of the switching element QL2. The diodes DQH1, DQH2, DQL1 and DQL2 are diodes built into the switching elements QH1, QH2, QL1 and QL2 or external diodes connected to the switching elements QH1, QH2, QL1 and QL2. The diodes DQH1, DQH2, DQL1 and DQL2 are connected in the direction opposite to the flow of current through the switching elements QH1, QH2, QL1 and QL2 (anti-parallel connection).

The input terminal of the PFM control circuit 20 is connected to an output voltage terminal Vo, and the output terminal to the gate terminals of the switching elements QH1, QH2, QL1 and QL2.

The electrostatic shield plate S1 is connected to a connection point where the source terminal of the switching element QH1 and the drain terminal of the switching element QL1 are connected (i.e. the terminal of the reactor Lr that is situated at the side opposite to where the primary winding N1 of the transformer T2 and the reactor Lr are connected) with an electric line.

Figure 1:
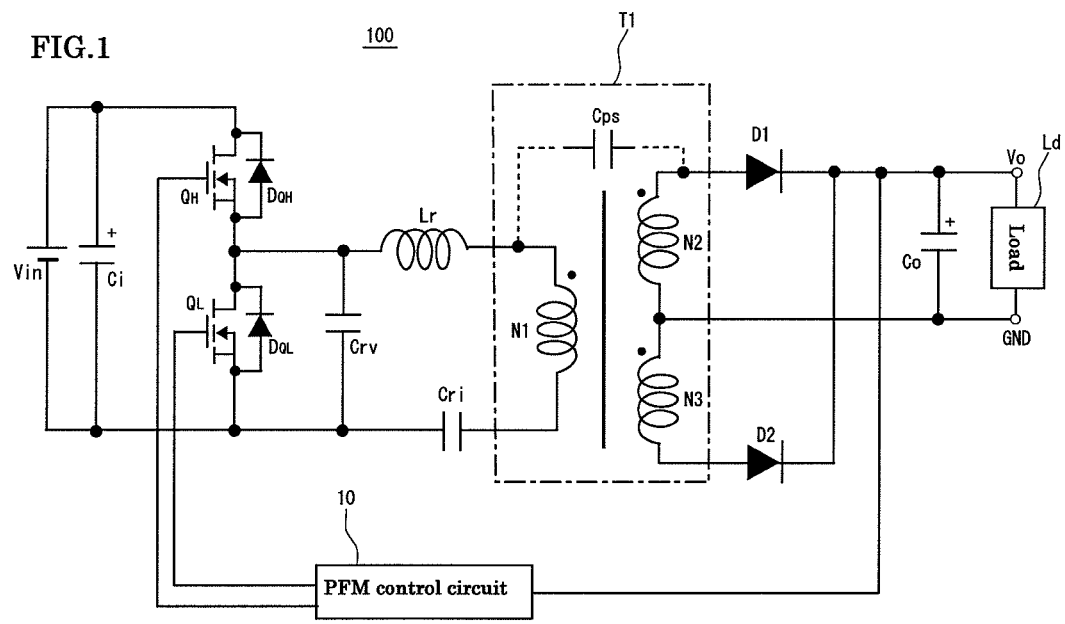
FIG. 1 is a diagram illustrating the circuit configuration of a conventional resonant switching power supply device when an electrostatic shield plate is not provided for a transformer.
Figure 2:
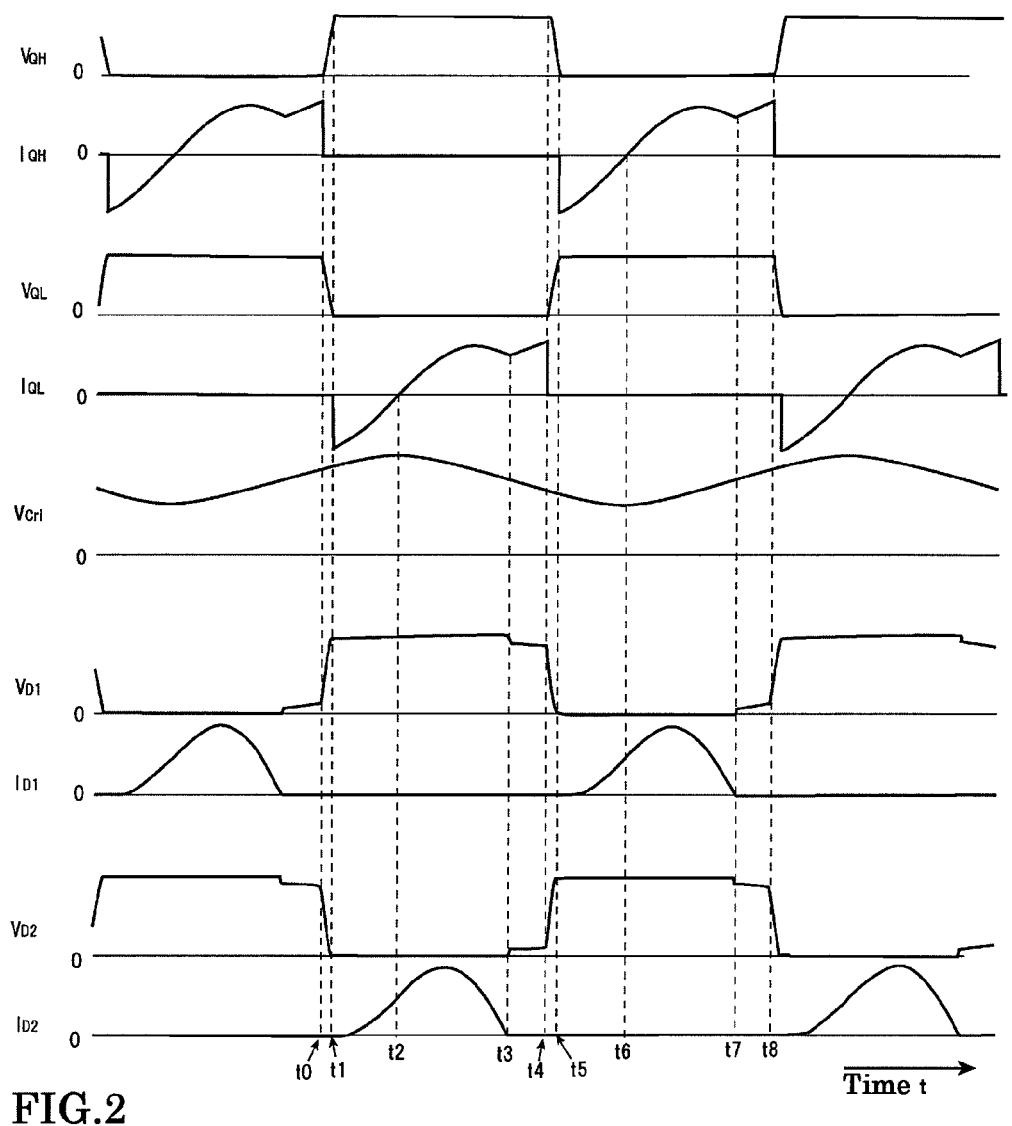
FIG. 2 is a diagram showing an operational sequence (around a rated load) of the conventional resonant switching power supply device shown in FIG. 1.
Figure 5:
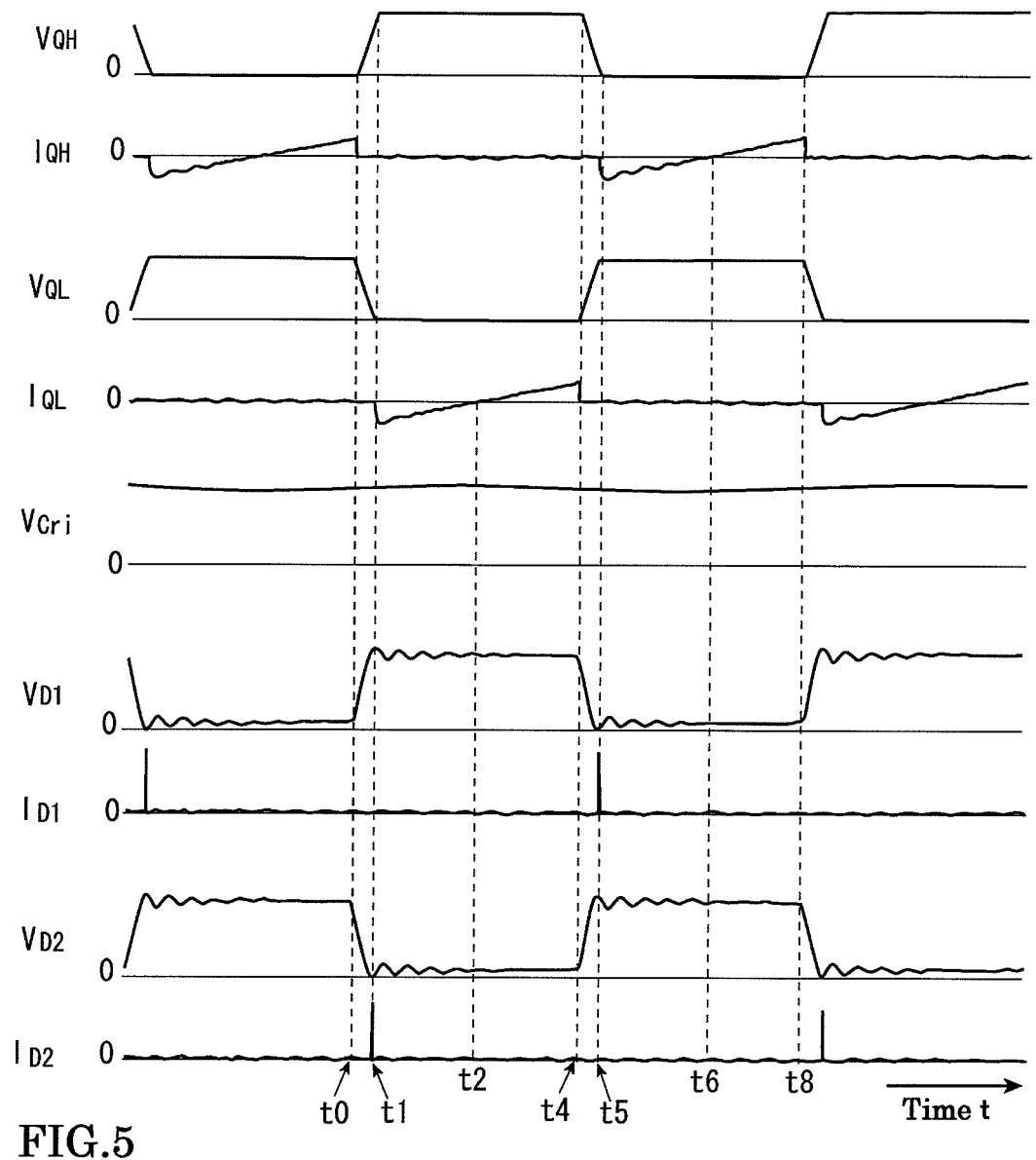
FIG. 5 is a diagram showing an operational sequence (when there is no load) of the conventional resonant switching power supply device shown in FIG. 1.

The secondary-side structure of the transformer T2 will be not described here since the structure is the same as in FIG. 1.

Even in this case, as in the case of the resonant switching power supply device 1 of the first embodiment shown in FIG. 9, when illustrated with an equivalent circuit, the leakage inductance Lr1+Lr2 and the stray capacitance Cps1' form a parallel circuit, as does the equivalent circuit of FIG. 10; what is formed is a current path that is similar to the current path D indicated by alternate long and short dash line in FIG. 10. The resonant current caused by the leakage inductance Lr1+Lr2 and the stray capacitance Cps1' flows through the current path. At this time, the voltage applied to the stray capacitance Cps1' is equal to the sum of the voltage that occurs at the leakage inductance Lr1 and the voltage at the leakage inductance Lr2; the figure is extremely smaller than that of the power supply voltage Vin. Accordingly, as in the case of the first embodiment, a smaller amount of energy is accumulated in the stray capacitance Cps. The oscillating voltage caused by the resonance of the leakage inductance Lr and the stray capacitance Cps, in turn, becomes smaller, making it possible to reduce the increase of the voltage of the transformer's secondary-side circuit resulting from the effects of the oscillating voltage. Thus, it is possible to reduce the increase of the switching frequency of the resonant switching power supply device 3 when there is no load.

Fourth Embodiment

Figure 14:
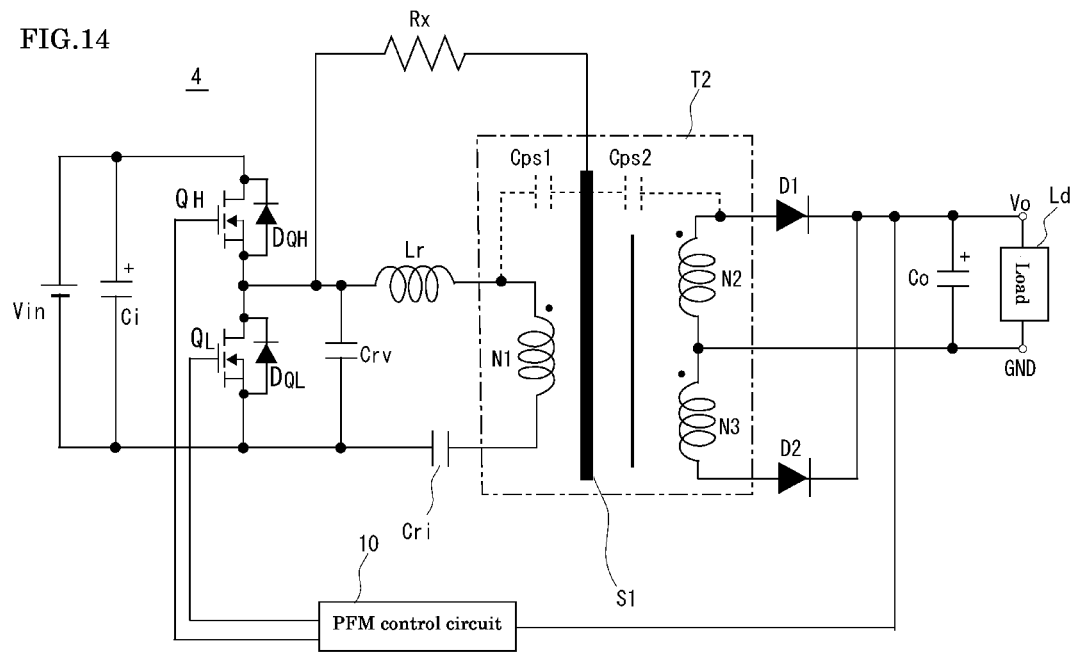
FIG. 14 is a diagram showing the circuit configuration of a resonant switching power supply device according to a fourth embodiment of the present invention.

FIG. 14 is a diagram showing the circuit configuration of the resonant switching power supply device 4 according to a fourth embodiment of the present invention.

The resonant switching power supply device 4 of FIG. 14 and the resonant switching power supply device 1 of the first embodiment shown in FIG. 9 are different in that the electrostatic shield plate S1 of the present embodiment is connected to a connection point where the source terminal of the switching element QH and the drain terminal of the switching element QL are connected (i.e. the terminal of the reactor Lr that is situated at the side opposite to where the primary winding N1 of the transformer T2 and the reactor Lr are connected) through a resistor Rx. The rest is the same in configuration as the resonant switching power supply device 1 shown in FIG. 9.

Even in this case, as in the case of the resonant switching power supply device 1 of the first embodiment shown in FIG. 9, when illustrated with an equivalent circuit, the leakage inductance Lr1+Lr2 and the stray capacitance Cps1' form a parallel circuit, as does the equivalent circuit of FIG. 10; what is formed is a current path that is similar to the current path D indicated by alternate long and short dash line in FIG. 10. The resonant current caused by the leakage inductance Lr1+Lr2 and the stray capacitance Cps1' flows through the current path. However, in this case, the stray capacitance Cps1' is connected in parallel to the leakage inductance Lr1+Lr2 through the resistor Rx. Therefore, the oscillating current caused by the stray capacitance Cps1' and the leakage inductance Lr1+Lr2 is attenuated by the resistor Rx and the oscillation is reduced. Accordingly, it is possible to reduce the oscillation in a more effective manner as well as to reduce the increase of the voltage of the transformer's secondary-side circuit resulting from the effects of the oscillating voltage. Thus, it is possible to reduce the increase of the switching frequency of the resonant switching power supply device 4 when there is no load.

The above has described in detail the present invention with reference to the embodiments. Needless to say, the present invention is not limited to the above embodiments; modifications may be made without departing from the scope of the present invention.

What is claimed is:

1. A resonant switching power supply device equipped with a pulse frequency modulation (PFM) control circuit to control a switching frequency in such a way that an output voltage is brought to a desired value, the device comprising:
   a resonant circuit where a primary winding of a transformer and a current resonant capacitor are connected in series;
   a rectifying circuit that is connected to a secondary winding of the transformer and obtains the output voltage;
   an electrostatic shield plate disposed between the primary winding and secondary winding of the transformer; and
   at least a pair of two switching elements connected in series; wherein
   one terminal of the current resonant capacitor is directly connected to one terminal of the primary winding, and
   the electrostatic shield plate is directly connected to another terminal of the primary winding and is connected to a connection point of the two switching elements connected in series.

2. The resonant switching power supply device according to claim 1, wherein the transformer is a leakage transformer.

3. The resonant switching power supply device according to claim 2, wherein the resonant circuit is connected to both ends of a low-side switching element of a half bridge circuit where a high-side switching element and the low-side switching element are connected in series.

4. The resonant switching power supply device according to claim 2, wherein the resonant circuit is connected to both ends of a high-side switching element of a half bridge circuit where the high-side switching element and a low-side switching element are connected in series.

5. The resonant switching power supply device according to claim 2, wherein the resonant circuit is connected between a connection point where a first high-side switching element and first low-side switching element of a full bridge circuit in which a series structure of the first high-side switching element and the first low-side switching element and a series structure of a second high-side switching element and a second low-side switching element are connected across an input direct-current power source are connected and a connection point where the second high-side switching element and the second low-side switching element are connected.

6. The resonant switching power supply device according to claim 1, wherein the resonant circuit is connected to both ends of a low-side switching element of a half bridge circuit where a high-side switching element and the low-side switching element are connected in series.

7. The resonant switching power supply device according to claim 1, wherein the resonant circuit is connected to both ends of a high-side switching element of a half bridge circuit where the high-side switching element and a low-side switching element are connected in series.

8. The resonant switching power supply device according to claim 1, wherein the resonant circuit is connected between a connection point where a first high-side switching element and first low-side switching element of a full bridge circuit in which a series structure of the first high-side switching element and the first low-side switching element and a series structure of a second high-side switching element and a second low-side switching element are connected across an input direct-current power source are connected and a connection point where the second high-side switching element and the second low-side switching element are connected.

9. A resonant switching power supply device equipped with a pulse frequency modulation (PFM) control circuit to control a switching frequency in such a way that an output voltage is brought to a desired value, the device comprising:
   a resonant circuit where a primary winding of a transformer, a current resonant capacitor and a reactor are connected in series;
   a rectifying circuit that is connected to a secondary winding of the transformer and obtains the output voltage;
   an electrostatic shield plate disposed between the primary winding and secondary winding of the transformer; and
   at least a pair of two switching elements connected in series; wherein
   one terminal of the current resonant capacitor is directly connected to one terminal of the primary winding,
   one terminal of the reactor is directly connected to another terminal of the primary winding, and
   the electrostatic shield plate is directly connected to another terminal of the reactor and is connected to a connection point of the two switching elements connected in series.

10. The resonant switching power supply device according to claim 9, wherein the transformer is a leakage transformer.

11. The resonant switching power supply device according to claim 10, wherein the resonant circuit is connected to both ends of a low-side switching element of a half bridge circuit where a high-side switching element and the low-side switching element are connected in series.

12. The resonant switching power supply device according to claim 10, wherein the resonant circuit is connected to both ends of a high-side switching element of a half bridge circuit where the high-side switching element and a low-side switching element are connected in series.

13. The resonant switching power supply device according to claim 10, wherein the resonant circuit is connected between a connection point where a first high-side switching element and first low-side switching element of a full bridge circuit in which a series structure of the first high-side switching element and the first low-side switching element and a series structure of a second high-side switching element and a second low-side switching element are connected across an input direct-current power source are connected and a connection point where the second high-side switching element and the second low-side switching element are connected.

14. The resonant switching power supply device according to claim 9, wherein the resonant circuit is connected between a connection point where a first high-side switching element and first low-side switching element of a full bridge circuit in which a series structure of the first high-side switching element and the first low-side switching element and a series structure of a second high-side switching element and a second low-side switching element are connected across an input direct-current power source are connected and a connection point where the second high-side switching element and the second low-side switching element are connected.

15. The resonant switching power supply device according to claim 9, wherein the resonant circuit is connected to both ends of a low-side switching element of a half bridge circuit where a high-side switching element and the low-side switching element are connected in series.

16. The resonant switching power supply device according to claim 9, wherein the resonant circuit is connected to both ends of a high-side switching element of a half bridge circuit where the high-side switching element and a low-side switching element are connected in series.

* * * * *